Sept. 5, 1961 — L. S. PERGANDE — 2,998,658
MACHINE FOR CHECKING CURVIC COUPLINGS AND THE LIKE
Filed Aug. 27, 1957 — 2 Sheets-Sheet 1
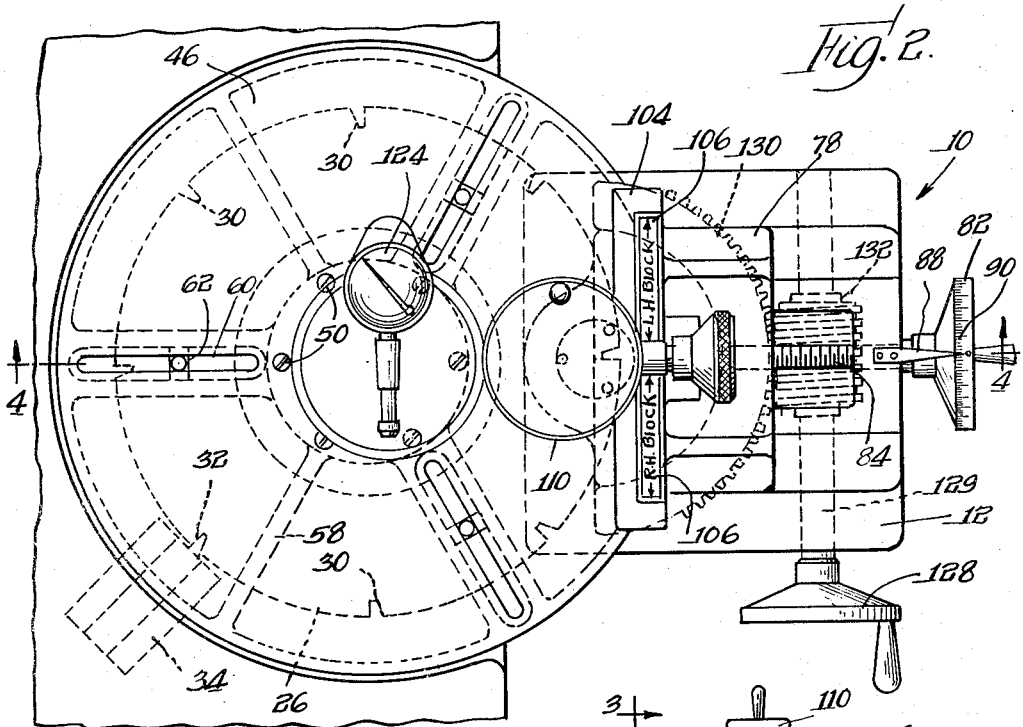
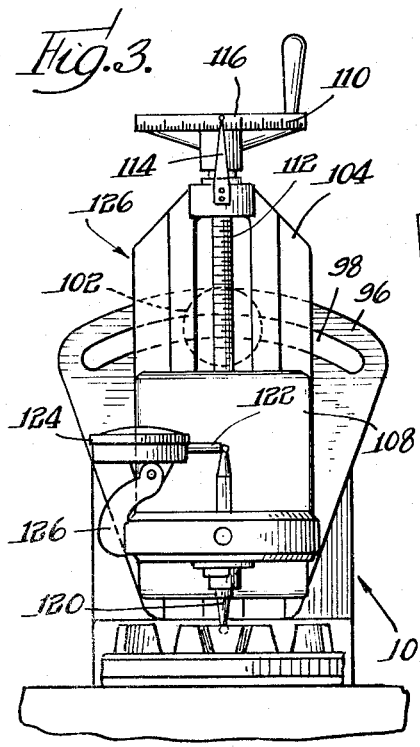
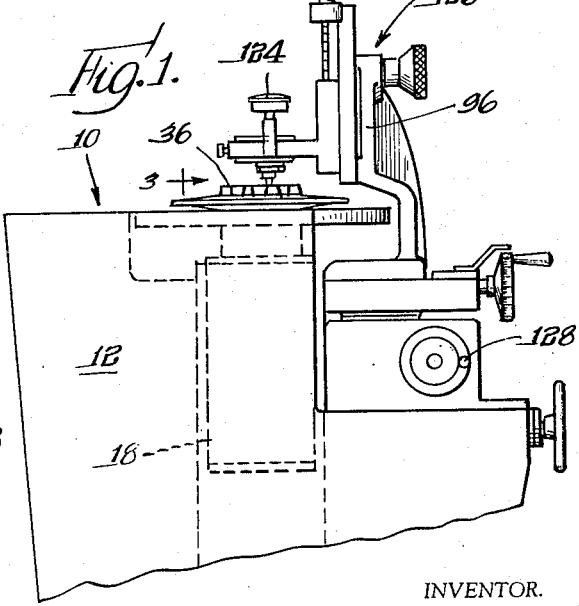
INVENTOR.
Leslie S. Pergande
BY Olson & Trexler
attys Sept. 5, 1961 L. S. PERGANDE 2,998,658
MACHINE FOR CHECKING CURVIC COUPLINGS AND THE LIKE
Filed Aug. 27, 1957 2 Sheets-Sheet 2

INVENTOR.
Leslie S. Pergande
BY
Olson & Trexler
attys.

United States Patent Office 2,998,658
Patented Sept. 5, 1961

2,998,658
MACHINE FOR CHECKING CURVIC COUPLINGS AND THE LIKE
Leslie S. Pergande, Mount Prospect, Ill., assignor to Illinois Tool Works, Chicago, Ill., a corporation of Illinois
Filed Aug. 27, 1957, Ser. No. 680,443
8 Claims. (Cl. 33—179.5)

This invention relates to a machine for measuring curvature and profile of curvic couplings and related devices. Curvic couplings are in the nature of toothed, face-type clutches and are widely used in aircraft jet engines as a means to tie together the various banks of buckets or impeller blades found in such engines. In the past, it has been the common practice to check such couplings by testing the mating characteristics of one coupling against a master. Obviously, this is not desirable as there is no means for analytically checking the master. There is good chance for a build-up of errors through a succession of masters. There is always the possibility of loss or destruction of a master.

The two opposed sides of a given tooth in a curvic coupling are curved in opposite directions, the teeth being either convex or concave depending upon which of the two mating couplings is chosen. The teeth are ground to a theoretical radius which must be accurate within prescribed tolerances to assure proper engagement with mating couplings. A tooth form normally has a straight side when viewed in a radial direction.

Accordingly, it is an object of this invention to provide a machine for analytically testing the curvature, profile, and spacing of the teeth of such curvic couplings.

Furthermore, it is an object of this invention to provide such a machine which is readily adjustable to compensate for the different radii of curvature to which the teeth of different curvic couplings are ground.

It is another object of this invention to provide a machine for checking curvic couplings which is capable of checking either a single tooth, or of sequentially checking the opposite side of a symmetrically disposed tooth without indexing of the coupling.

Figure 4:
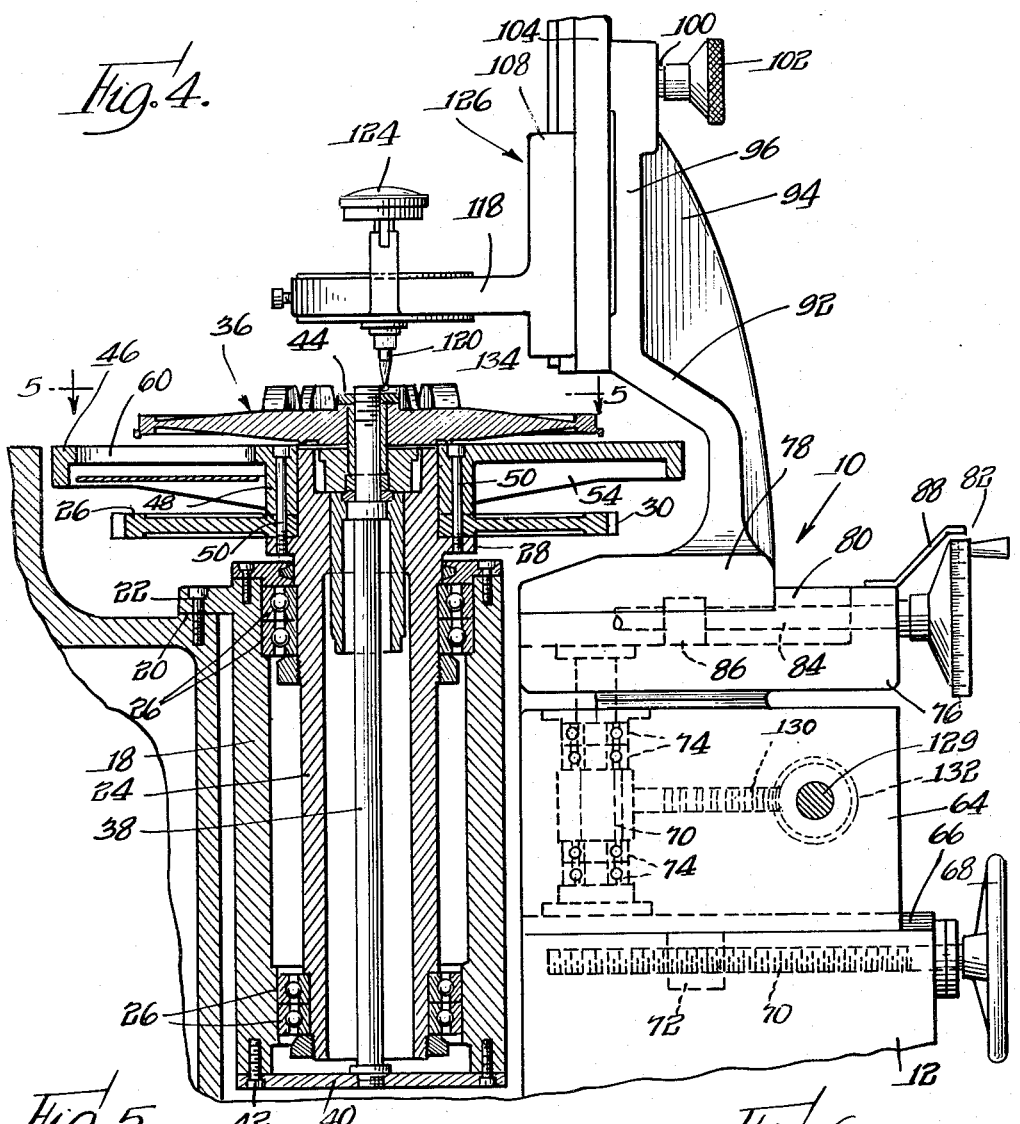
Figure 5:
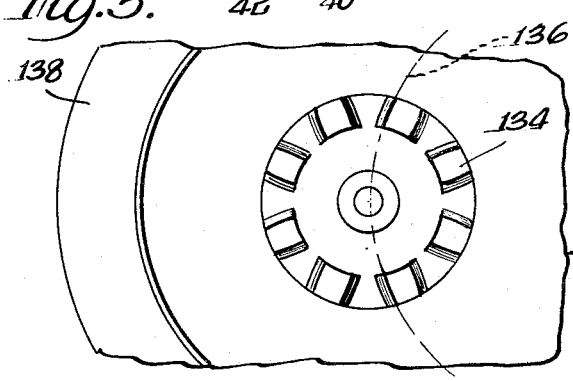
Figure 6:
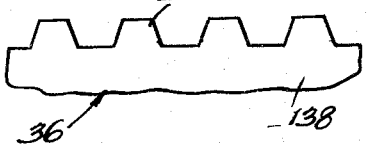

Other and further objects and advantages of the present invention will be apparent from the following description when taken in connection with the accompanying drawings wherein:

FIG. 1 is a side view of a machine constructed in accordance with the principles of this invention;
FIG. 2 is a top view thereof;
FIG. 3 is a fragmentary end view thereof as taken substantially along the line 3—3 in FIG. 1;
FIG. 4 is a vertical sectional view as taken substantially along the line 4—4 in FIG. 2;
FIG. 5 is a fragmentary horizontal view, partly in section, as taken substantially along the line 5—5 in FIG. 4; and
FIG. 6 is a fragmentary side view layout of the article shown in FIG. 5.

Referring now in greater particularity to the drawings, there will be seen a machine 10 having a base 12. A spindle housing 18 is secured in the base by means of bolts 20 passed through integral lugs or flanges 22 extending outwardly from the housing, the bolts being threaded into suitable tapped apertures in the base. The housing 18 is cylindrical, and a precision live spindle 24 is journaled therein, by means of ball bearings 26 at the top and bottom thereof. The spindle 24 is hollow as will be apparent. A precision index plate 26 is secured to a radially extending circumferential flange 28 adjacent the top of the spindle 24. This index plate is provided with equally arcuately spaced notches 30, and a pawl 32 is mounted in a pawl box 34 adjacent the circumference of the index plate for selective cooperation with the recesses 30. As will be apparent, the pawl is preferably spring pressed toward the index plate and is retractable by any known suitable means. In the illustrative example, the workpiece or curvic coupling is held in place by a standard drawbar 38. The drawbar is threaded at its lower end into a plate 40 enclosing the lower end of the spindle housing and held in place by bolts 42. The drawbar also is threaded at its upper end for receipt of a nut 44.

A face plate 46 is secured at the top of the spindle, and has a depending cylindrical skirt 48 resting on top of the index plate 26. Bolts 50 extend through the face plate 46 including the depending skirt 48 thereof, and also extend through the index plate 26, being threaded into suitable apertures in the flange 28, whereby to mount both the face plate and the index plate. The face plate 46 is provided with radial bracing flanges 54 on its under side, and also with slots 60 for receiving clamping fixtures as at 62, whereby to hold work parts which are incapable of being mounted by the drawbar 38.

A slide 64 is mounted on the base 12 by means of the well known dovetail guide ways 66, and a hand wheel 68 is provided for turning a screw 70 threaded through a nut 72 carried from the underside of the slide 64. Accordingly, the slide readily may be shifted along the guide ways 66 by rotating the hand wheel 68. The slide is mounted at right angles to the spindle 18, and is arranged radially thereof. Bearings 74 mounted in the slide adjacent the top and bottom thereof journal a shaft or axle 70 fixed at its upper end to a bed 76. The center line of the shaft or axle 70 constitutes the center of curvature of the teeth of the curvic coupling to be checked, and shifting of the slide 64 by means of a hand wheel 68 properly locates this center for couplings having teeth with different radii of curvature.

A secondary slide 78 is mounted on the bed 76 by means of guideways 80. A handwheel 82 is fixed on a shaft 84 threaded through a nut member 86 for advancing and retracting the secondary slide properly to position a testing member carried thereby relative to the work piece 36 following locating of the center of curvature as noted above.

The pointer 88 extends diagonally upward from the top of the bed 76 and overlies the knob 82 for cooperation with indicia 90 thereon to indicate the position of the secondary slide 78.

The secondary slide 78 has an upright 92 thereon, provided with bracing webs 94. The upright 92 is provided with an intermediate offset portion for providing clearance for the face plate 46, and at its upper end the upright is provided with a sector 96 having an arcuate slot 98 therein receiving a stud 100 having a knob 102 thereon, the stud being secured to a vertical slide bed 104. The angle of the slide bed 104 relative to the sector 100 is adjusted by means of graduated pressure angle setting blocks 106, of known construction. The threaded stud 100 provides for tipping the slide bed 104 back and forth, as will be apparent.

A slide 108 is mounted for vertical reciprocation on the slide bed 104. A hand wheel 110 is provided at the top of the slide bed, and acts through a screw 112 on which it is fixed to move the slide 108 up and down. A pointer 114 is fixed on the front of the slide bed 104, and cooperates with suitable indicia 116 on the handwheel 110 to indicate the elevation of the slide.

The slide is provided with a horizontal arm 118 projecting out over the spindle 24 and workpiece 36. The arm pivotally supports a checking or testing finger 120 of a type well known in the gear testing and allied arts. The upper end of the finger engages the plunger 122 of a standard pickup device such as an indicating instrument 124. The instrument 124 is supported by an upstanding arm 126 on the horizontal arm 118. As will be understood, the finger or the instrument may also be connected in a conventional manner to operate the pen of a recording device.

The bed 76 and parts supported thereon including the slide 78, upright 92, and sector 96, and the associated parts including the slide bed 104, the slide 108, the arm 118, and the pickup finger 120 and indicating instrument 124 constitute a checking head identified generally by the numeral 126. The checking head is pivotal or rotatable about the pivot axis 70, which is adjusted to the center of curvature of the teeth of the curvic coupling or workpiece 36 as previously indicated. To this end, a hand wheel 128 is fixed on the end of the horizontal shaft 129 extending through the slide 64. An arcuate rack, or more properly a pinion or worm gear sector 130, depends from the bed 76, and a worm wheel or the like 132 on the shaft 129 engages the sector 130 for pivoting the checking head about the shaft 70.

The workpiece 36 is shown in some detail in FIGS. 4–6. The entire workpiece previously has been referred to as the curvic coupling, but in a more restricted sense the curvic coupling may be considered to be the face teeth 134. As will be seen, opposite teeth are formed with their arcuate sides by a common arc as indicated at 136. The radius of this arc is the radius of curvature previously referred to and the slide is adjusted to set the center of the shaft 70 at the center of the arc 136. As will be understood, a complementary part has teeth with concave sides, as opposed to the convex sides of the teeth 134. The larger portion of the workpiece, as indicated at 138, is commonly known as the pine tree. The buckets or blades of a turbine are attached to this part.

In order to check or test a workpiece, the theoretical radius of curvature of the sides of the teeth 134 is established by turning the hand wheel 68 to shift the slide 64. Then the workpiece is installed at the top of the spindle 24 by means of the drawbar 38, or it may be secured to the face plate 46, as previously indicated. The hand wheel 82 of the bed is operated to adjust the position of the slide 78 to secure proper contact of the finger 120 with the teeth 134. Similarly, the angular position of the slide base 104 relative to the vertical is adjusted by means of the blocks 106 and the knob 102, in accordance with the type of workpiece being tested. The head then is pivoted by means of the hand wheel 128, as previously indicated, and the indicating instrument or meter 124 is observed for readings greater than the maximum error acceptable. The teeth are thus checked from side to side, and the teeth may be checked from top to bottom by rotating the hand wheel 110 to raise and lower the slide 108. Conveniently, two teeth may be checked at the same setting of the machine, due to the common arc defining the sides thereof. Subsequently the pawl 32 is manually retracted, and the workpiece is manually indexed to bring the next notch or recess 30 into position for engagement by the pawl, and the checking operation is repeated. As will be apparent, with reference to FIG. 5, one side of the teeth is checked by engagement in the upper position, while the other side is checked by engagement in the lower position, these terms being applicable to the workpiece as viewed in FIG. 5.

The specific example of the machine as shown herein is for illustrative purposes only. Various changes in structure will no doubt occur to those skilled in the art, and are to be understood as forming a part of this invention in so far as they fall within the spirit and scope of the appended claims.

The invention is claimed as follows:

1. A machine for checking workpieces having arcuately spaced curved surfaces comprising a base, workpiece mounting means rotatably mounted on said base for bringing said curved surfaces sequentially into position for checking, index means for holding said workpiece mounting means in successive checking positions, a sub base, slide means mounting said sub base on said base for movement toward and away from said workpiece, means for moving said sub base along said slide means, a bed, means pivotally mounting said bed on said sub base, means for pivoting said bed relative to said sub base, a support, slide means mounting said support on said bed for movement generally toward and away from said workpiece, means for moving said support, a slide base, means mounting said slide base on said support for pivotal movement about an axis generally transverse of said workpiece, a testing member holder, slide means mounting said testing member holder for movement on said slide base toward and away from said workpiece generally axially thereof, a testing member mounted on said holder engageable with said workpiece, and error noting means operated by said testing member.

2. A machine as set forth in claim 1 wherein the workpiece is mounted for rotation about a vertical axis, and wherein the support is substantially vertically upstanding from the bed.

3. A machine as set forth in claim 2 wherein the support has a horizontal offset providing clearance for the workpiece and the workpiece mounting means.

4. A machine for checking workpieces comprising a base, means for mounting a workpiece on said base, a sub-base, slide means mounting said sub-base on said base for movement toward and away from said workpiece, means for moving said sub-base along said slide means, a bed, pivot means mounting said bed on said sub-base, gear means associated with said pivot means for pivoting said bed relative to said sub-base, a support, slide means mounting said support on said bed for movement generally toward and away from said workpiece, means for moving said support, a slide base, means mounting said slide base on said support for pivotal movement about an axis generally transverse of said workpiece, a testing member holder, slide means mounting said testing member holder for movement on said slide base toward and away from said workpiece generally axially thereof, a testing member mounted on said holder engageable with said workpiece, and error noting means operated by said testing member.

5. A machine for checking workpieces having curved surfaces comprising a base, means on said base for supporting a workpiece in pivotally mounted relation thereto on a first axis thereof and in a testing position, a sub-base mounted on said base for movement toward and away from said first axis of said workpiece, pivot means mounted on said sub-base for movement therewith, testing head means pivotally mounted in said pivot means on said sub-base movable with said sub-base toward and away from said workpiece and pivotal in said pivot means about an axis parallel to the said first axis of the workpiece, a testing member carried by said testing head means and engageable with said workpiece and arcuately movable upon pivoting of said head to check a curved surface of said workpiece, and error noting means operated by said testing member, said testing head means including a holder on which said testing member is mounted, and means for tilting said testing member holder about an axis transverse of the said first axis of the workpiece.

6. A machine as set forth in claim 5 wherein means is provided for moving said testing head holder transversely of the direction of movement of said sub-base.

7. A machine for checking workpieces having curvalinear surfaces comprising first base means, support means mounted on said first base means and having a first axis, said support means being adapted to support a workpiece for rotatable movement about said first axis, second base means mounted for relative movement toward and away from said first axis, pivot means mounted on said second base means for movement therewith testing head means associated with said pivot means on said second base means for movement therewith and pivotally mounted for movement about a second axis spaced from and paralleled to said first axis, and testing means mounted for pivotal movement with said testing head means and engageable with a workpiece supported on said first axis.

8. A machine for checking workpieces having curvalinear surfaces comprising first base means, support means mounted on said first base means and having a first axis, said support means being adapted to support a workpiece for rotatable movement about said first axis, second base means mounted for relative movement toward and away from said first axis, pivot means mounted on said second base means for movement therewith testing head means associated with pivot means of said second base means for movement therewith and pivotally mounted for movement about a second axis spaced from and parallel to said first axis, said testing head means including a holder means mounted for relative movement toward and away from said support means in a plane perpendicular to the movement of said second base means, and a testing member mounted for movement with said testing head means and holder means and engageable with a workpiece supported on said first axis.

References Cited in the file of this patent

UNITED STATES PATENTS

| | | |
|---|---|---|
| 1,846,270 | Olson | Feb. 23, 1932 |
| 1,886,543 | Hansen | Nov. 8, 1932 |
| 1,949,014 | Gleason | Feb. 27, 1934 |
| 2,124,006 | Parker | July 19, 1938 |
| 2,309,142 | Stafford | Jan. 26, 1943 |
| 2,648,135 | Gates | Aug. 11, 1953 |
| 2,861,348 | Carlsen | Nov. 25, 1958 |

FOREIGN PATENTS

| | | |
|---|---|---|
| 605,041 | Germany | Nov. 2, 1934 |